United States Patent
Kim

(10) Patent No.: US 12,306,009 B2
(45) Date of Patent: May 20, 2025

(54) METHOD AND APPARATUS FOR RECOGNIZING PARKING SPACE

(71) Applicant: HYUNDAI MOBIS CO., LTD., Seoul (KR)

(72) Inventor: Wan Jin Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 203 days.

(21) Appl. No.: 17/983,768

(22) Filed: Nov. 9, 2022

(65) Prior Publication Data
US 2023/0213352 A1    Jul. 6, 2023

(30) Foreign Application Priority Data

Jan. 5, 2022  (KR) .................. 10-2022-0001480

(51) Int. Cl.
| | | |
|---|---|---|
| G01C 21/00 | (2006.01) | |
| B60W 30/06 | (2006.01) | |
| G01S 7/48 | (2006.01) | |
| G01S 17/86 | (2020.01) | |
| G01S 17/89 | (2020.01) | |
| G06F 18/23 | (2023.01) | |
| G06V 20/58 | (2022.01) | |

(52) U.S. Cl.
CPC ......... *G01C 21/3815* (2020.08); *B60W 30/06* (2013.01); *G01C 21/3841* (2020.08); *G01S 7/4802* (2013.01); *G01S 17/86* (2020.01); *G01S 17/89* (2013.01); *G06F 18/23* (2023.01); *G06V 20/586* (2022.01); *G06V 20/582* (2022.01)

(58) Field of Classification Search
CPC .......... G01C 21/3815; G01C 21/3841; B60W 30/06; G01S 7/4802; G01S 17/86; G01S 17/89; G06V 20/586; G06V 20/582
See application file for complete search history.

(56) References Cited

U.S. PATENT DOCUMENTS

| | | | |
|---|---|---|---|
| 11,904,939 B2 * | 2/2024 | Jang ................. | B60W 60/0025 |
| 2008/0136673 A1 * | 6/2008 | Jung ...................... | G08G 1/168 |
| | | | 340/932.2 |

(Continued)

FOREIGN PATENT DOCUMENTS

JP    2021146968 A  *  9/2021

OTHER PUBLICATIONS

English Machine Translation of JP-2021146968-A, Sep. 27, 2021, 13 pages, provided by J-Plat Pat.*

(Continued)

*Primary Examiner* — Wilson W Tsui
*Assistant Examiner* — David Faber
(74) *Attorney, Agent, or Firm* — Morgan, Lewis & Bockius LLP

(57) ABSTRACT

This disclosure provides a method and apparatus for recognizing a parking space.
An aspect of the present disclosure provides a method, performed by an apparatus of a host vehicle, for recognizing a parking space, the method including: recognizing another vehicle and a pillar based on data acquired from a light detection and ranging (lidar) device; recognizing a parking slot marking based on an image captured by a camera; and generating a map of an indoor parking lot based on information on the another vehicle, the pillar, and the parking slot marking.

18 Claims, 5 Drawing Sheets

(56) References Cited

U.S. PATENT DOCUMENTS

| | | | | |
|---|---|---|---|---|
| 2009/0207045 | A1* | 8/2009 | Jung | G06T 7/74 |
| | | | | 340/932.2 |
| 2016/0189324 | A1* | 6/2016 | Eramian | H04W 4/40 |
| | | | | 705/13 |
| 2016/0358474 | A1* | 12/2016 | Uppal | G06V 20/20 |
| 2017/0203757 | A1* | 7/2017 | Ohbayashi | B60W 30/085 |
| 2018/0045535 | A1* | 2/2018 | Kim | G01C 21/206 |
| 2018/0120851 | A1* | 5/2018 | Shin | B62D 15/0285 |
| 2018/0232583 | A1* | 8/2018 | Wang | G06V 10/82 |
| 2020/0132473 | A1* | 4/2020 | Shipley | G01C 21/1652 |
| 2020/0166349 | A1* | 5/2020 | Ogata | G08G 1/168 |
| 2020/0193184 | A1* | 6/2020 | Okada | G06V 20/586 |
| 2020/0278688 | A1* | 9/2020 | Sarkar | B62D 15/0285 |
| 2020/0307554 | A1* | 10/2020 | Lai | G06V 20/582 |
| 2021/0042540 | A1* | 2/2021 | Shih | B62D 15/0285 |
| 2021/0213939 | A1* | 7/2021 | Woo | G05D 1/0016 |
| 2022/0043152 | A1* | 2/2022 | Li | G01S 17/66 |
| 2022/0146640 | A1* | 5/2022 | Filatov | G01S 17/931 |
| 2022/0198928 | A1* | 6/2022 | Liu | G01C 21/28 |
| 2022/0332308 | A1* | 10/2022 | Suzuki | B60K 35/22 |
| 2022/0383746 | A1* | 12/2022 | Takagi | G08G 1/143 |
| 2022/0415058 | A1* | 12/2022 | Takagi | G06V 10/25 |
| 2023/0005277 | A1* | 1/2023 | Ge | G06V 20/586 |
| 2024/0078794 | A1* | 3/2024 | Zimmermann | G06V 20/56 |
| 2024/0221275 | A1* | 7/2024 | Narita | G06T 19/20 |

OTHER PUBLICATIONS

Börcs et al., "Instant Object Detection in Lidar Point Clouds", IEEE Geoscience and Remote Sensing Letters, vol. 14, No. 7, Jul. 2017, 5 pgs.*

* cited by examiner

METHOD AND APPARATUS FOR RECOGNIZING PARKING SPACE

CROSS-REFERENCE TO RELATED APPLICATION

The present application is based on and claims the benefit of priority to Korean Patent Application Number 10-2022-0001480, filed on Jan. 5, 2022 in the Korean Intellectual Property Office, the entire disclosure of which is incorporated herein by reference.

TECHNICAL FIELD

The present disclosure relates to a method and apparatus for recognizing a parking space.

BACKGROUND

The content described below merely provides background information related to the present embodiment and does not constitute a prior art.

The development of technologies such as driving assist that ensures driver safety and provides driving convenience and autonomous driving that enables a vehicle to travel on a road by itself without a driver's intervention is being accelerated. In particular, there is growing interest in autonomous parking technologies that enable a vehicle to perform parking, which is difficult for many drivers. In order to perform autonomous parking, accurately recognizing a parking space is essential.

As an example of a technology for recognizing a parking space, there is a technology for searching for a parking space around a vehicle using an ultrasonic wave sensor. The disadvantage of this technology is that it cannot recognize the structure of a parking facility (for example, a pillar or a parking line, etc.).

As another example of a technology for recognizing a parking space, there is a technology for recognizing a structure or a parking space of a parking facility using a marker or a communication module attached to a wall or floor of the parking facility. The disadvantage of this technology is that it cannot be applied to a general parking facility that does not have a marker or communication module attached.

SUMMARY

An embodiment of the present disclosure provides an apparatus and method for recognizing a parking space capable of recognizing a structure of a parking facility without a marker or a communication module.

An embodiment of the present disclosure provides an apparatus and method for recognizing a parking space capable of distinguishing a structure of a parking facility from another vehicle based on data acquired using a Light Detection and Ranging (LIDAR) device.

The aspects of the present invention are not limited to the foregoing, and other aspects not mentioned herein will be able to be clearly understood by those skilled in the art from the following description.

An aspect of the present disclosure provides a method, performed by an apparatus of a host vehicle, for recognizing a parking space, the method comprising: recognizing another vehicle and a pillar based on data acquired from a light detection and ranging (lidar) device; recognizing a parking slot marking based on an image captured by a camera; and generating a map of an indoor parking lot based on information on the another vehicle, the pillar, and the parking slot marking.

Another aspect of the present disclosure provides an apparatus for recognizing a parking space, the apparatus comprising: an object recognizer configured to recognize another vehicle and a pillar based on data acquired from a light detection and ranging (lidar) device; a parking slot marking recognizer configured to recognize a parking slot marking based on an image captured by a camera; and a map generator configured to generate a map of an indoor parking lot based on information on the another vehicle, the pillar, and the parking slot marking.

Another aspect of the present disclosure provides a vehicle comprising: at least one lidar mounted on the vehicle; at least one camera mounted on the vehicle; and an apparatus for recognizing a parking space, the apparatus configured to recognize another vehicle and a pillar based on data acquired from the lidar, recognize a parking slot marking based on an image captured by the at least one camera, and generate a map of an indoor parking lot based on information on the pillar and the parking slot marking.

According to an embodiment of the present disclosure, it is possible to recognize a structure of a parking facility without a marker or a communication module.

According to an embodiment of the present disclosure, it is possible to distinguish another vehicle and a structure of a parking facility based on data acquired from a LIDAR device.

The effects of the present disclosure are not limited to the above-mentioned effects, and other effects not mentioned above will be clearly understood by those skilled in the art from the following description.

DETAILED DESCRIPTION

Figure 1:
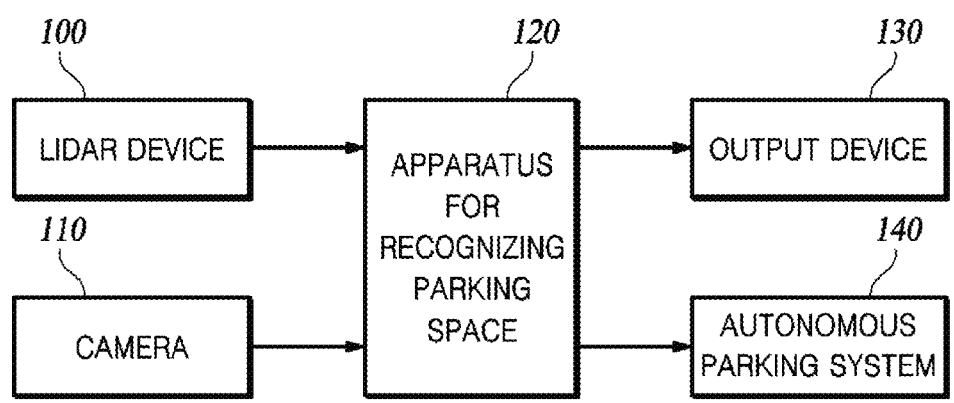
FIG. 1 is a block diagram of a vehicle according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present invention, and is not intended to represent the only embodiments in which the present invention may be practiced.

FIG. 1 is a block diagram of a vehicle according to an embodiment of the present disclosure.

As shown in FIG. 1, a vehicle 10 according to an embodiment of the present disclosure may include all or at least one of a Light Detection and Ranging (LIDAR) device 100, a camera 110, an apparatus 120 for recognizing a parking space, an output device 130, and an autonomous parking system 140. Each component may be a device mounted on the vehicle 10 or logic. Not all blocks shown in FIG. 1 are essential components, and some blocks included in the vehicle 10 may be added, changed, or deleted in another embodiment. For example, in the case of the vehicle 10 that does not support an autonomous parking function, the autonomous parking system 140 may not be included. In the present disclosure, the vehicle 10 may be referred to as a host vehicle to be distinguishable from other vehicles which will be described later.

The LIDAR device 100 may be mounted on the vehicle 10 and generate data in the form of a point cloud about an object (for example, another vehicle or a pillar, etc.) around the vehicle. To this end, the LIDAR device 100 may be mounted at any one of a front, rear, and lateral side of the vehicle 10, but is not limited thereto, and the position of the LIDAR device 100 may vary according to the embodiment. The LIDAR device 100 may be referred to as a sensor (or Lidar sensor). After irradiating a laser pulse to an object within a measurement range, by measuring a time during which the laser pulse reflected from the object returns, the LIDAR device 100 may sense information such as a distance to the object, a direction of the object, a speed, and so forth.

The camera 110 may be mounted on the vehicle 10 and may provide an image of a surrounding area of the vehicle 10. According to an embodiment of the present disclosure, the camera 110 may be able to photograph a parking line and/or reserved parking sign (for example, a sign for disabled parking only, a sign for electric vehicles parking only, a sign for compact cars parking only, a sign for expectant mothers parking only, a sign for women parking only, etc.). To this end, the camera 110 may be mounted on any one of a front, rear, and lateral side of the vehicle 10, but aspects of the present disclosure are not limited thereto, and the position of the camera 110 may vary according to the embodiment.

The apparatus 120 for recognizing a parking space may recognize a parking space in an indoor parking lot based on data acquired from the LIDAR device 100 and an image captured by the camera 110. The apparatus 120 for recognizing a parking space may acquire the positions of other vehicles, pillars, and parking lines in the indoor parking lot and generate a map of the indoor parking lot based on the acquired positions. The apparatus 120 for recognizing a parking space may search for an available parking space based on the map of the indoor parking lot.

The output device 130 may be a Human-Machine-Interface (HMI) between the vehicle 10 and an occupant (or driver) present therein, and may be configured to output information received from the apparatus 120 for recognizing a parking space. In one example, the output device 130 may output information on a parking path (trajectory). In another example, when the driver attempts to park in an unavailable parking space, the output device 130 may output a warning sound, a warning message, or a vibration. The output device 130 may include all or at least one of a display device, a sound output device, and a haptic output device.

The display device may include all or at least one of a display, an audio video navigation (AVN), a head up display (HUD), a cluster, and the like which are provided in one area of the vehicle 10, such as a seat.

The sound output device may output audio data such as a voice and/or a notification tone. The audio data may be pre-stored or may be generated by the apparatus 120 for recognizing a parking space. The sound output device may include all or at least one of a speaker and a buzzer.

The haptic output device may output a signal in a form that can be tactilely recognized by a user. For example, the haptic output device may be implemented as a vibration module to control vibration intensity and pattern. The haptic output device may be provided in a steering wheel, a seat belt, and/or a seat of the vehicle 10.

The autonomous parking system 140 may control movement of the vehicle 10.

According to embodiments, the autonomous parking system 140 may generate an autonomous parking path for moving the vehicle 10 to an available parking space based on information received from the apparatus 120 for recognizing a parking space. The autonomous parking system 140 may generate a signal for controlling the movement of the vehicle 10 according to the autonomous parking path. The autonomous parking system 140 may electrically control various vehicle drive devices in the vehicle 10 through the generated signal. The vehicle drive devices may include a steering device, a brake device, a suspension device, a power train, and the like.

Figure 2:
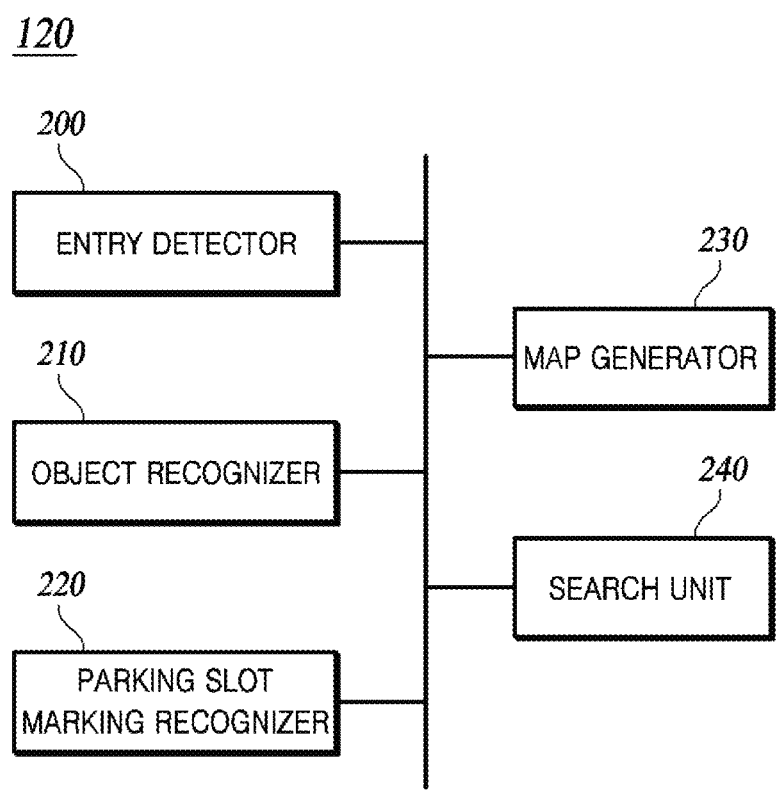
FIG. 2 is a block diagram schematically illustrating an apparatus for recognizing a parking space according to an embodiment of the present disclosure.

FIG. 2 is a block diagram schematically illustrating an apparatus for recognizing a parking space according to an embodiment of the present disclosure.

As shown in FIG. 2, an apparatus 120 for recognizing a parking space according to an embodiment of the present disclosure may include all or at least one of an entry detector 200, an object recognizer 210, a parking slot marking recognizer 220, a map generator 230, and a search unit 240. Not all the blocks shown in FIG. 2 are essential components, and some blocks included in the apparatus 120 for recognizing a parking space may be added, changed, or deleted in another embodiment. According to an exemplary embodiment of the present disclosure, the apparatus 120 for recognizing a parking space may include a processor (e.g., computer, microprocessor, CPU, ASIC, circuitry, logic circuits, etc.) and an associated non-transitory memory storing software instructions which, when executed by the processor, provides the functionalities of the entry detector 200, the object recognizer 210, the parking slot marking recognizer 220, the map generator 230, and the search unit 240. Herein, the memory and the processor may be implemented as separate semiconductor circuits. Alternatively, the memory and the processor may be implemented as a single integrated semiconductor circuit. The processor may embody one or more processor(s). Each component of the apparatus 120 for recognizing a parking space may be implemented as hardware, software, or a combination of hardware and software. In addition, a function of each component may be implemented as software and one or more processors may be implemented to execute a function of the software corresponding to each component.

The entry detector 200 may detect that a vehicle 10 has entered an indoor parking lot.

The entry detector 200 may determine whether the vehicle 10 has entered the indoor parking lot based on position information of the vehicle. To this end, the entry detector 200 may receive the position information from a navigation device or a GPS receiver provided in the vehicle 10. According to an exemplary embodiment of the present disclosure, the navigation device may include a processor (e.g., computer, microprocessor, CPU, ASIC, circuitry, logic circuits, etc.) and an associated non-transitory memory storing software instructions which, when executed by the processor, provides the functionalities of the navigation device. Herein, the memory and the processor may be implemented as separate semiconductor circuits. Alternatively, the memory and the processor may be implemented as a single integrated semiconductor circuit. The processor may embody one or more processor(s).

According to embodiments, the entry detector 200 may determine whether the vehicle 10 has entered the indoor parking lot by additionally using a sensor value of an illuminance sensor mounted on the vehicle 10. For example, when the position information of the vehicle 10 corresponds to position information of a facility with the indoor parking lot and an amount of decrease in the illuminance sensor values is greater than or equal to a preset threshold, the entry detector 200 may determine that the vehicle 10 has entered the indoor parking lot.

The object recognizer 210 may recognize a pillar (hereinafter, referred to as a parking pillar) of the indoor parking lot and another vehicle based on data acquired from a LIDAR device 100.

The object recognizer 210 may recognize an arbitrary single object and distinguish whether the single object is another vehicle or a parking pillar.

The object recognizer 210 may recognize an L-Shape related to a single object from a point cloud, calculate an angle of the L-Shape, and identify whether the single object is another vehicle or a parking pillar.

Figure 3A:
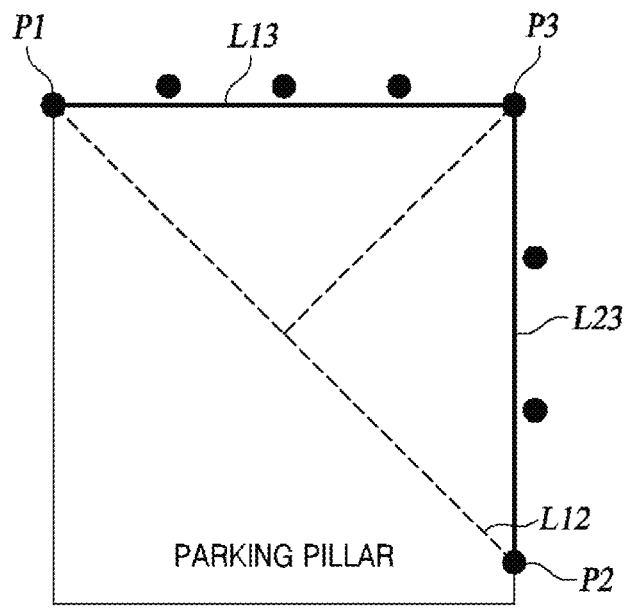
FIGS. 3A and 3B are exemplary views for explaining the operation of an object recognizer according to an embodiment of the present disclosure.
Figure 3B:
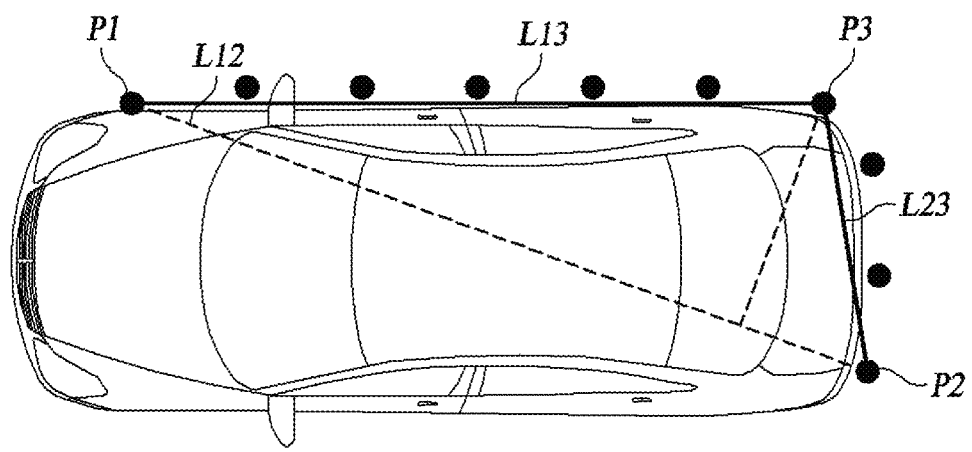

FIGS. 3A and 3B are exemplary views for explaining the operation of an object recognizer according to an embodiment of the present disclosure.

Referring to FIGS. 3A and 3B, an object recognizer 210 may cluster points related to a single object from a point cloud, and calculate a first point P1 and a second point P2 with the greatest straight line distance in a clustered point cloud.

The object recognizer 210 may calculate a third point P3 at the greatest distance from the first straight line L12, which connects the first point P1 and the second point P2, in the clustered point cloud.

The object recognizer 210 may calculate a second straight line L13 connecting the first point P1 and the third point P3, and a third straight line L23 connecting the second point P2 and the third point P3.

The object recognizer 210 may identify whether a single object is another vehicle or a parking pillar, based on the angle between the second straight line L13 and the third straight line L23.

For example, as shown in FIG. 3A, when the angle between the second straight line L13 and the third straight line L23 is within a preset angle range, the object recognizer 210 may identify a single object as a parking pillar. Here, the preset angle range may be a range including 90 degrees. That is, the preset angle range may be a range between angles smaller or greater than 90 degrees by a predetermined angle. The preset angle range may mean an angle range sufficient to distinguish between an L-Shape formed by a parking pillar and an L-Shape formed by another vehicle. The preset angle range may vary according to the embodiment.

On the other hand, as shown in FIG. 3B, when the angle between the second straight line L13 and the third straight line L23 is outside the preset angle range, the object recognizer 210 may identify the single object as another vehicle.

Meanwhile, before recognizing the L-Shape shape of the single object, the object recognizer 210 may perform pre-processing to remove noise or the like in the point cloud. A specific method for the object recognizer 210 to perform pre-processing on data acquired from a LIDAR device 100 or to cluster points related to the single object from the point cloud is common knowledge in the existing lidar signal processing field, and thus, a detailed description thereof will be omitted herein. In the present disclosure, the method is not limited to a specific method. According to embodiments, the object recognizer 210 may acquire pre-processed and/or clustered data from the lidar 100.

The parking slot marking recognizer 220 may recognize a parking slot marking based on an image captured by the camera 110. The parking slot marking recognizer 220 may recognize one or more of a parking line position, a parking line color, and a reserved parking sign from the image captured by the camera 110. Here, the reserved parking sign may include a reserved parking sign for one or more of the disabled, electric vehicles, compact vehicles, expectant mothers, and women.

Meanwhile, a specific method for the parking slot marking recognizer 220 to recognize one or more of a parking line position, a parking line color, and a reserved parking sign based on an image captured by the camera 110 is common knowledge in the existing image recognition field, and thus, a detailed description thereof will be omitted herein. In the present disclosure, the method is not limited to a specific method. According to embodiments, the parking slot marking recognizer 220 may receive information on a parking line position, a parking line color, and a reserved parking sign from the camera 110.

A map generator 230 may generate a map of an indoor parking lot based on information recognized by the object recognizer 210 and the parking slot marking recognizer 220.

Figure 4A:
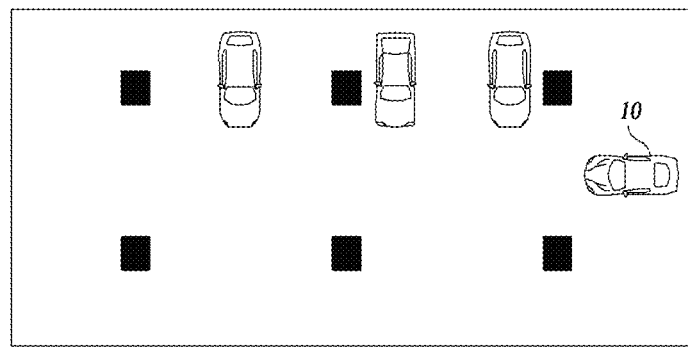
FIGS. 4A to 4C are exemplary views for explaining the operation of a map generator according to an embodiment of the present disclosure.
Figure 4B:
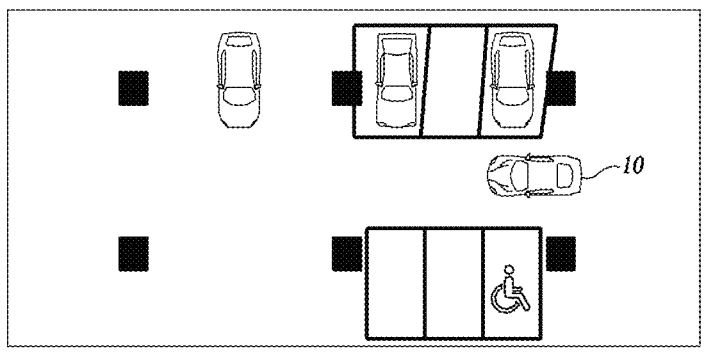
Figure 4C:
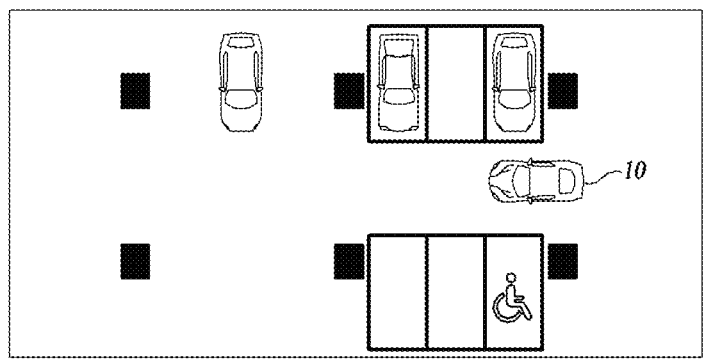

FIGS. 4A to 4C are exemplary views for explaining the operation of a map generator according to an embodiment of the present disclosure.

Referring to FIG. 4A, a map generator 230 may generate a map of an indoor parking lot based on position coordinates of a parking pillar and another vehicle recognized by an object recognizer 210. According to embodiments, the map generator 230 may generate a map of the indoor parking lot based on position coordinates of a parking pillar, and record position coordinates of another vehicle in the generated map.

Referring to FIG. 4B, the map generator 230 may record a parking slot marking recognized by the parking slot marking recognizer 220 on a map. In this case, information recognized by the parking slot marking recognizer 220 may be less accurate than information recognized by the object recognizer 210. As a result, a position of a parking line and a position of a parking pillar on the map may overlap, or an angle of the parking line may be slanted. According to embodiments, when a distance between the boundary of a parking line and the boundary of a parking pillar is less than or equal to a preset threshold, the map generator 230 may exclude the corresponding parking line from the map.

Referring to FIG. 4C, the map generator 230 may correct a position and an angle of a parking line based on information on a parking pillar. For example, the map generator 230 may correct the position and angle of the parking line based on a position of the parking pillar and an angle of an L-shape.

The search unit 240 may search for an available parking space based on the map of the indoor parking lot. The search unit 240 may determine a space satisfying a preset condition among one or more candidate spaces as an available parking space.

The search unit 240 may determine, on the map of the indoor parking lot, a space in which no other vehicle is present and of which at least one of four sides is surrounded by a parking line as a candidate space.

The search unit 240 may determine among candidate spaces a space that is not a reserved parking space as an available parking space.

In one embodiment, when the color of a parking line surrounding a candidate space is all white, the search unit 240 may determine the candidate space as an available parking space.

In one embodiment, when there is no reserved parking sign in a candidate space, the search unit 240 may determine the candidate space as an available parking space.

In one embodiment, the search unit 240 may determine whether a candidate space is an available parking space based on a difference between a length of a shorter side of the candidate space and a width of a preset reserved parking space. For example, when the difference between the length of the shorter side of the candidate space and the width of the predetermined reserved parking space is within a predetermined threshold, the search unit 240 may determine the candidate space is not an available parking space.

In an embodiment, the search unit 240 may determine a space satisfying all of the above-described conditions as an available parking space.

In order to assist a driver's parking, the search unit 240 may generate a parking path (or trajectory) to the available parking space and then display the generated parking path to the output device 130 or provide information relevant to the generated parking path to the autonomous parking system 140 so that the vehicle 10 travels to the available parking space. According to an exemplary embodiment of the present disclosure, the search unit 240 may include a processor (e.g., computer, microprocessor, CPU, ASIC, circuitry, logic circuits, etc.) and an associated non-transitory memory storing software instructions which, when executed by the processor, provides the functionalities of the search unit 240. Herein, the memory and the processor may be implemented as separate semiconductor circuits. Alternatively, the memory and the processor may be implemented as a single integrated semiconductor circuit. The processor may embody one or more processor(s).

Figure 5:
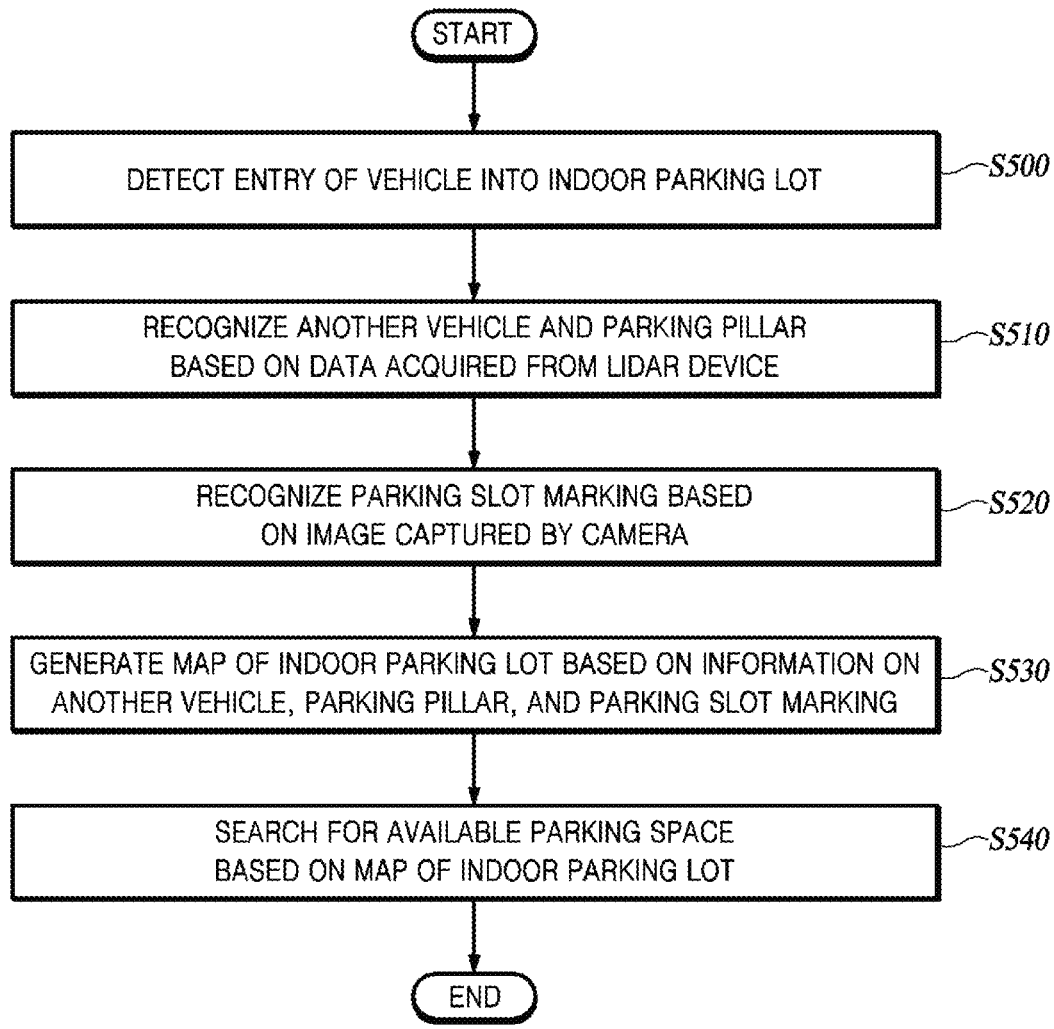
FIG. 5 is a flowchart illustrating a method for recognizing a parking space according to an embodiment of the present disclosure.

FIG. 5 is a flowchart illustrating a method for recognizing a parking space according to an embodiment of the present disclosure.

The method shown in FIG. 5 may be performed by the above-described apparatus 120 for recognizing a parking space or the vehicle 10 equipped therewith, and any redundant description will be omitted.

The apparatus 120 for recognizing a parking space may detect an entry of the vehicle 10 into an indoor parking lot in operation S500. In one example, the apparatus 120 for recognizing a parking space may detect the entry of the vehicle 10 into the indoor parking lot based on position information received from a navigation device or a GPS receiver provided in the vehicle 10. The apparatus 120 for recognizing a parking space may detect the entry of the vehicle 10 into the indoor parking lot based on an amount of change in illuminance sensor values. For example, when the position information corresponds to position information of a facility with the indoor parking lot and the amount of change in the illuminance sensor values is greater than or equal to a preset threshold, it may be determined that the vehicle 10 has entered the indoor parking lot.

The apparatus 120 for recognizing a parking space may recognize another vehicle and a parking pillar based on data acquired from a LIDAR device in operation S510.

In one embodiment, the apparatus 120 for recognizing a parking space may cluster points related to a single object from a point cloud acquired from a LIDAR device, calculate a first point and a second point with the greatest straight line distance in a clustered point cloud, calculate a third point at the greatest distance from a first straight line that connects the first point and the second point, calculate a second straight line connecting the first and third points and a third straight line connecting the second and third points, and identify whether the single object is another vehicle or a parking pillar based on an angle between the second straight line and the third straight line.

In this case, when the angle between the second straight line and the third straight line is within a preset angle range, the apparatus 120 for recognizing a parking space may identify the single object as a parking pillar. On the other hand, when the angle between the second straight line and the third straight line is outside the preset angle range, the apparatus 120 for recognizing a parking space may identify the single object as another vehicle. In this case, the preset angle range may be a range between angles smaller or greater than 90 degrees by a predetermined angle.

The apparatus 120 for recognizing a parking space may recognize a parking slot marking based on an image captured by a camera in operation S520. The apparatus 120 for recognizing a parking space may recognize one or more of a parking line position, a parking line color, and a reserved parking sign based on the image captured by the camera. Here, the reserved parking sign may include a reserved parking sign for one or more of the disabled, electric vehicles, compact vehicles, expectant mothers, and women.

The apparatus 120 for recognizing a parking space may generate a map of the indoor parking lot based on information on another vehicle, a parking pillar, and a parking line in operation S530. The apparatus 120 for recognizing a parking space may correct a position and an angle of the parking line based on information on a parking pillar.

The apparatus 120 for recognizing a parking space may search for an available parking space based on the map of the indoor parking lot in operation S540.

In one embodiment, the apparatus 120 for recognizing a parking space may determine, as a candidate space, a space in which no other vehicle is present and of which at least one of four sides is surrounded by a parking line.

In one embodiment, the apparatus 120 for recognizing a parking space may determine the candidate space as an available parking space when the color of the parking line surrounding the candidate space is all white.

In one embodiment, the apparatus 120 for recognizing a parking space may determine the candidate space as an available parking space when there is no reserved parking sign in the candidate space.

In one embodiment, the apparatus 120 for recognizing a parking space may determine whether the candidate space is an available parking space based on a difference between a length of a shorter side of the candidate space and a width of a preset reserved parking space. For example, when the difference between the length of the shorter side of the candidate space and the width of the preset reserved parking space is within a preset threshold, the apparatus 120 for recognizing a parking space may determine that the candidate space is not an available parking space.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a compact disc ROM (CD-ROM), magnetic tape, a floppy disk, a memory card, a hard disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof

What is claimed is:

1. A method, performed by an apparatus of a host vehicle, for recognizing a parking space, the method comprising:
   recognizing another vehicle and a pillar based on data acquired from a light detection and ranging (lidar) device, including:
   clustering points related to a single object from a point cloud acquired from the lidar device;
   calculating a first point and a second point with a longest distance from a straight line distance in the clustered points;
   calculating a third point, from the clustered points, at a longest distance from a first straight line that connects the first point and the second point;
   calculating a second straight line connecting the first and third points and a third straight line connecting the second and third points; and
   identifying whether the single object is the another vehicle or the pillar, based on a value of an angle between the second straight line and the third straight line;
   recognizing a parking slot marking based on an image captured by a camera;
   generating a map of an indoor parking lot comprising one or more available parking spaces based on information on the recognized another vehicle, the recognized pillar, and the recognized parking slot marking;
   guiding a movement of the host vehicle to one of the one or more available parking spaces based on the generated map.

2. The method of claim 1, further comprising:
   detecting an entry of the host vehicle into the indoor parking lot based on position information received from a navigation device or a GPS receiver provided in the host vehicle.

3. The method of claim 2, wherein in the detecting of the entry of the host vehicle, the entry of the host vehicle into the indoor parking lot is detected based on an amount of change in illuminance sensor values.

4. The method of claim 1, wherein in the identifying of whether the single object is the another vehicle or the pillar, the single object is identified as the pillar when the value of the angle falls within a preset angle range, and the single object is identified as the another vehicle when the value of the angle is outside the preset angle range.

5. The method of claim 4, wherein the preset angle range is a range between values of angles smaller than or greater than 90 degrees by a predetermined angle value.

6. The method of claim 1, wherein the recognizing of the parking slot marking is recognizing one or more of a position of a parking line, a color of the parking line, and a reserved parking sign.

7. The method of claim 6, wherein the reserved parking sign comprises a sign of a reserved parking space for one or more of the disabled, electric vehicles, compact vehicles, expectant mothers, and women.

8. The method of claim 6, wherein the generating of the map comprises correcting a position and a value of an angle of the parking line based on information on the pillar.

9. The method of claim 1, further comprising:
   searching for an available parking space of the one or more available parking spaces based on the map of the indoor parking lot.

10. The method of claim 9, wherein in the searching for the available parking space, a space in which the another vehicle is not present and of which at least one of four sides is surrounded by a parking line is determined as a candidate space.

11. The method of claim 10, wherein in the searching for the available parking space, the candidate space is determined as the available parking space when the parking line surrounding the candidate space is white.

12. The method of claim 10, wherein in the searching for the available parking space, the candidate space is determined as the available parking space when there is no reserved parking sign in the candidate space.

13. The method of claim 10, wherein in the searching for the available parking space, whether the candidate space is the available parking space is determined based on a difference between a length of a shorter side of the candidate space and a width of a preset reserved parking space.

14. An apparatus for recognizing a parking space, the apparatus comprising:
at least one processor configured to:
recognize another vehicle and a pillar based on data acquired from a light detection and ranging (lidar) device, including:
cluster points related to a single object from a point cloud acquired from the lidar device;
calculate a first point and a second point with a longest distance from a straight line distance in the clustered points;
calculate a third point, from the clustered points, at a longest distance from a first straight line that connects the first point and the second point;
calculate a second straight line connecting the first and third points and a third straight line connecting the second and third points; and
identify whether the single object is the another vehicle or the pillar, based on a value of an angle between the second straight line and the third straight line;
recognize a parking slot marking based on an image captured by a camera;
generate a map of an indoor parking lot comprising one or more available parking spaces based on information on the recognized another vehicle, the recognized pillar, and the recognized parking slot marking; and
guide a movement of a vehicle to one of the one or more available parking spaces based on the generated map.

15. The apparatus of claim 14,
wherein the at least one processor is configured to detect an entry of a host vehicle into the indoor parking lot based on position information received from a navigation device or a GPS receiver provided in the host vehicle.

16. The apparatus of claim 14, wherein the at least one processor is further configured to identify the single object as the pillar when the value of the angle falls within a preset angle range, and identify the single object as the another vehicle when the value of the angle is outside the preset angle range.

17. The apparatus of claim 14, wherein the at least one processor is further configured to recognize one or more of a position of a parking line, a color of the parking line, and a reserved parking sign, and wherein the at least one processor is further configured to correct the position and an angle of the parking line based on information on the pillar.

18. A vehicle comprising:
at least one light detection and ranging (lidar) device mounted on the vehicle;
at least one camera mounted on the vehicle; and
at least one processor configured to:
recognize another vehicle and a pillar based on data acquired from the at least one lidar device, including:
cluster points related to a single object from a point cloud acquired from the at least one lidar device;
calculate a first point and a second point with a longest distance from a straight line distance in the clustered points;
calculate a third point, from the clustered points, at a longest distance from a first straight line that connects the first point and the second point;
calculate a second straight line connecting the first and third points and a third straight line connecting the second and third points; and
identify whether the single object is the another vehicle or the pillar, based on a value of an angle between the second straight line and the third straight line;
recognize a parking slot marking based on an image captured by the at least one camera;
generate a map of an indoor parking lot comprising one or more available parking spaces based on information on the recognized another vehicle, the recognized pillar, and the recognized parking slot marking; and
guide a movement of a vehicle to one of the one or more available parking spaces based on the generated map.

* * * * *